(12) United States Patent  
Assink et al.

(10) Patent No.: US 8,511,113 B2  
(45) Date of Patent: Aug. 20, 2013

(54) PROCESS FOR THE SEPARATION OF $CO_2$ FROM A GASEOUS FEED STREAM

(75) Inventors: Gerrit Jan Barend Assink, Amsterdam (NL); Gert Jan Kramer, Amsterdam (NL); Martin Van Sint Annaland, Enschede (NL); Martin Jan Tuinier, Enschede (NL)

(73) Assignee: Shell Oil Company, Houston, TX (US)

( * ) Notice: Subject to any disclaimer, the term of this patent is extended or adjusted under 35 U.S.C. 154(b) by 367 days.

(21) Appl. No.: 12/682,673

(22) PCT Filed: Oct. 10, 2008

(86) PCT No.: PCT/EP2008/063658  
§ 371 (c)(1),  
(2), (4) Date: Jul. 26, 2010

(87) PCT Pub. No.: WO2009/047341  
PCT Pub. Date: Apr. 16, 2009

(65) Prior Publication Data  
US 2011/0023537 A1 Feb. 3, 2011

(30) Foreign Application Priority Data

Oct. 12, 2007 (EP) .................................... 07118400  
Nov. 22, 2007 (EP) .................................... 07121365

(51) Int. Cl.  
*F25J 1/00* (2006.01)  
*F25J 3/00* (2006.01)  
*B01D 9/04* (2006.01)

(52) U.S. Cl.  
USPC .................... 62/602; 62/601; 62/928; 62/532

(58) Field of Classification Search  
USPC ................... 62/602, 640, 532, 542, 601, 928  
See application file for complete search history.

(56) References Cited

U.S. PATENT DOCUMENTS

| | | | | |
|---|---|---|---|---|
| 2,738,658 A * | 3/1956 | Brouson | | 62/638 |
| 4,265,088 A | 5/1981 | Funk | | 60/648 |
| 4,434,149 A * | 2/1984 | Withers et al. | | 423/496 |
| 7,073,348 B2 | 7/2006 | Clodic et al. | | 62/532 |
| 2011/0226006 A1 * | 9/2011 | Lackner et al. | | 62/602 |

FOREIGN PATENT DOCUMENTS

| | | |
|---|---|---|
| DE | 1751501 | 11/1971 |
| DE | 4134293 | 2/1993 |
| EP | 132452 | 2/1985 |
| EP | 0132452 * | 2/1985 |
| FR | 2836059 | 8/2003 |
| FR | 2867092 | 9/2005 |
| FR | 2867092 A1 * | 9/2005 |
| WO | WO2007074292 | 7/2007 |

* cited by examiner

*Primary Examiner* — Frantz Jules  
*Assistant Examiner* — Keith Raymond  
(74) *Attorney, Agent, or Firm* — Charles W. Stewart

(57) ABSTRACT

The invention provides a process for the separation of $CO_2$ from a gaseous feed stream, comprising the subsequent steps of: a) cooling a porous body in the form of a fixed bed (101,102,103) to a temperature below the sublimation temperature of $CO_2$ to obtain a cold body; b) contacting a gaseous feed stream (120) comprising $CO_2$ and one or more other gaseous compounds with the surface of the cold body to obtain a body comprising solid $CO_2$ and a $CO_2$-depleted effluent gas (124); and c) removing the solid $CO_2$ by exposing the porous body comprising solid $CO_2$ to a fluid $CO_2$ stream (130) having a temperature above the sublimation temperature of $CO_2$ whereby fluid $CO_2$ (136) and a warm porous body are obtained.

24 Claims, 3 Drawing Sheets

PROCESS FOR THE SEPARATION OF $CO_2$ FROM A GASEOUS FEED STREAM

The present application claims priority from European Patent Application 07118400.6 filed 12 Oct. 2007 and European Patent Application 07121365.6 filed 22 Nov. 2007.

FIELD OF THE INVENTION

The present invention provides a process for the separation of $CO_2$ from a gaseous feed stream.

BACKGROUND OF THE INVENTION

The capture of $CO_2$ from industrial process streams is gaining increased interest in response to growing concerns about greenhouse gas emissions into the atmosphere. Fossil and biomass-based energy conversion processes convert hydrocarbon materials into carbon dioxide and water while releasing energy. The purpose of $CO_2$ capture is to produce relatively pure $CO_2$ suitable for sequestration (such as geological storage or mineralization) or reuse.

Different process approaches have been devised for $CO_2$ capture in energy conversion processes such as the use of pure oxygen rather than air. In such processes, a flue gas containing only $CO_2$ and water is produced, circumventing dilution with nitrogen.

Alternatively, a separate chemical or physical process is used to extract $CO_2$ from a flue gas obtained via a conventional air-fired combustion process. Known processes for capturing $CO_2$ are for instance scrubbing with monoethanolamine (MEA) or dimethylformamide (DMF), Pressure Swing Adsorption (PSA) or membrane separation.

Other processes make use of the triple point of $CO_2$, which is approximately 5.2 bara and −56.7° C., and the fact that liquid $CO_2$ can only exist at certain temperatures and pressures above the $CO_2$ triple point.

In U.S. Pat. No. 7,073,348 is disclosed a process for the capture of $CO_2$ from flue gas at atmospheric pressure by contacting the flue gas with the external surface of a heat exchanger, while evaporating a refrigerant fluid on the inside. Solid $CO_2$ is deposited on the external walls of the heat exchanger. After a certain operating time, the flow of flue gas on the external part of the exchanger and refrigerant fluid on the inside of the exchanger are respectively switched over to a second parallel heat exchanger. The solid $CO_2$ deposited on the externals surface of the first heat exchanger is reheated from −78.5° C. to −56.5° C. at a pressure of 5.2 bar and the $CO_2$ is retrieved as a liquid phase.

Heat exchangers are expensive and have limited area available for heat exchange and deposition of the solid $CO_2$ As the refrigerant continuously provides cold to the evaporator surface, most of the $CO_2$ will deposit on the upstream side of the evaporator, resulting in an inhomogeneous distribution of the solid $CO_2$. Also, due to the build up of the solid $CO_2$ layer the pressure drop over the evaporator is increased significantly during operation. Furthermore, the resistance to heat transfer increases with the increasing thickness of the deposited solid $CO_2$ layer, resulting in an inefficient use of the refrigerant.

Consequently, it is necessary to operate the expensive and relatively sensitive evaporator apparatus under short deposit/removal cycles thereby exposing the evaporator apparatus to rapid changes in temperature, which is disadvantageous from a mechanical point of view.

U.S. Pat. No. 4,265,088 discloses a process for treating hot exhaust gas using two or more packed towers. In the process of U.S. Pat. No. 4,265,088 the hot exhaust gas is introduced in a packed tower, which was cooled to a temperature below the sublimation temperature of $CO_2$. The $CO_2$ is sublimated and thereby captured from the exhaust gas. The sublimated solid $CO_2$ is subsequently removed from the packed tower by applying a vacuum to the packed tower to induce evaporation of the solid $CO_2$. However, such a process can only be used for treating exhaust gases containing low concentrations of $CO_2$. When the exhaust gas contains high concentration of $CO_2$ the use of a vacuum becomes impractical. Alternatively, U.S. Pat. No. 4,265,088 discloses the use of treated exhaust gas to remove the solid $CO_2$ from the packed tower. However, this has the disadvantage that $CO_2$ is reintroduced in at least part of the treated exhaust gas. As a consequence the $CO_2$ cannot be directly provided to a $CO_2$ sequestration process and a new $CO_2$ contaminated gas stream is formed.

SUMMARY OF THE INVENTION

It has now been found that it is possible to separate $CO_2$ from for instance a flue gas, without the disadvantages mentioned herein above. In contrast to the prior art process for separating $CO_2$, which makes use of a continuous supply of cold, the present invention is based on a discontinuous supply of cold by providing a cooled body, such as a porous body as intermediate energy repository for $CO_2$ capture.

Accordingly, the present invention provides a process for the separation of $CO_2$ from a gaseous feed stream, comprising the steps of:
a) cooling a porous body in the form of a fixed bed to a temperature below the sublimation temperature of $CO_2$ to obtain a cold body;
b) contacting a gaseous feed stream comprising $CO_2$ and one or more other gaseous compounds with a surface of the cold body to obtain a body comprising solid $CO_2$ and a $CO_2$-depleted effluent gas; and
c) removing the solid $CO_2$ by exposing the porous body comprising solid $CO_2$ to a warm fluid $CO_2$ stream having a temperature above the sublimation temperature of $CO_2$ whereby fluid $CO_2$ and a warm porous body are obtained.

The process according to the present invention makes use of a previously cooled porous body having a surface to deposit $CO_2$. Such a porous body can only store a limited amount of cold and therefore the amount of $CO_2$ that can be deposited is also limited. As a consequence, no large build-up of $CO_2$ deposits can occur and the creation of a pressure drop over the separator is to a large extent prevented.

By using a porous body, a large specific surface area per unit volume may be available for heat exchange and $CO_2$ deposition. This may result in a decreased footprint and apparatus size.

By using fluid $CO_2$, such as fluid $CO_2$ effluent obtained from step c), to remove the solid $CO_2$ from the porous body, a pure stream of fluid $CO_2$ is obtained which can be directly provided to $CO_2$ sequestration process.

The process can be operated, using relatively simple process apparatus limiting the capital cost compared to the expensive evaporators used in the prior art process.

DETAILED DESCRIPTION OF THE INVENTION

Figure 1:
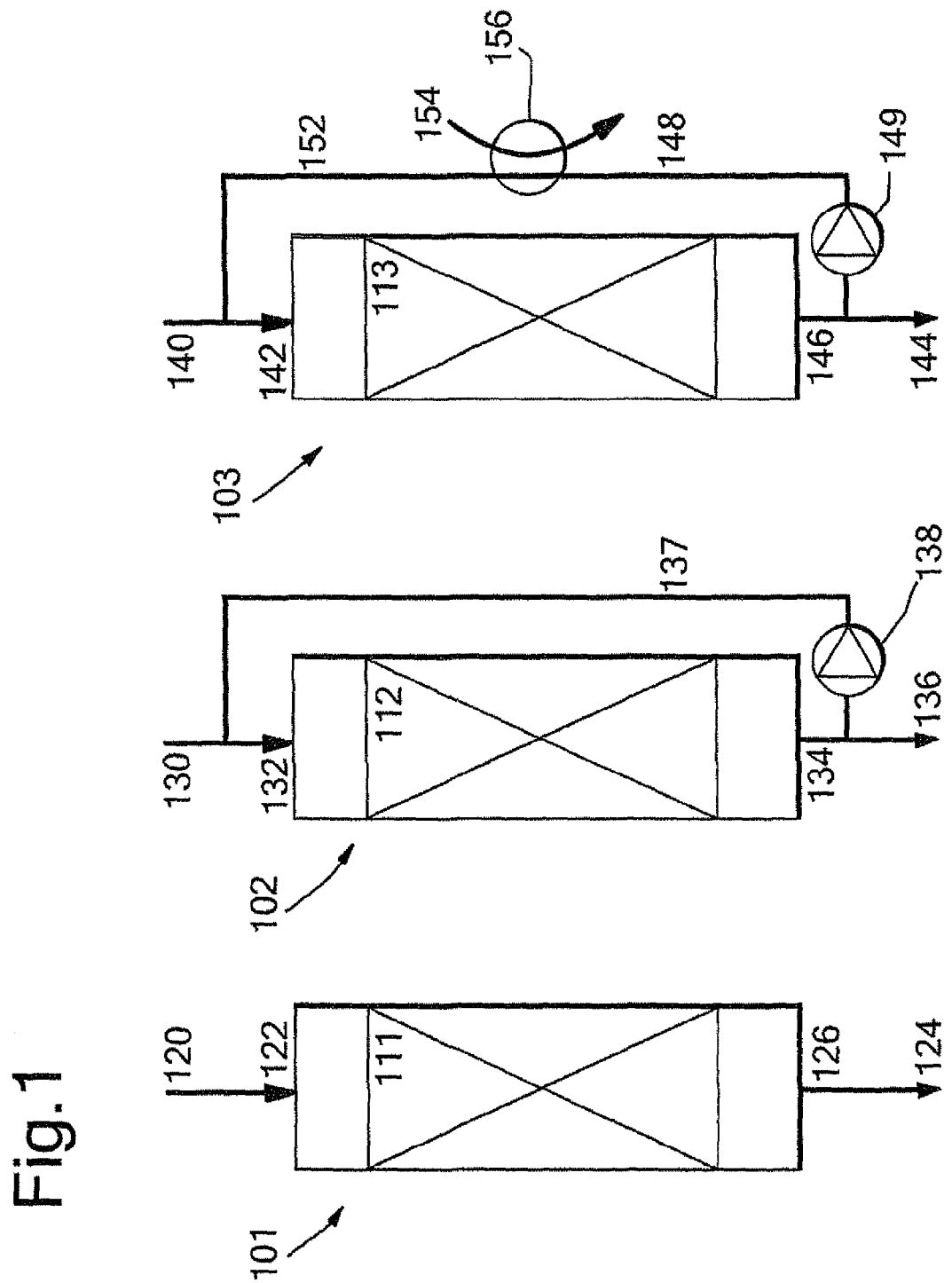
FIG. 1: a schematic representation of a process according to the invention using three separate fixed beds.

The present invention relates to the use of a previously cooled porous body to separate $CO_2$ from a gaseous feed stream comprising $CO_2$ and one or more other gaseous compounds. The porous body is first cooled and subsequently contacted with the $CO_2$-comprising gaseous feed stream. The obtained cold body may be used as an intermediate energy repository, i.e. it can be used to store a finite amount of energy, which is used at a later moment to sublimate $CO_2$. In contrast, known heat exchangers transfer heat substantially instantaneously, i.e. no intermediate storage of energy takes place.

It will be appreciated that heat transfer is, at least in part, dependent on the available surface area for heat transfer. Typically, a plate heat exchanger has a specific surface area of approximately 500 $m^2/m^3$. Monolithic packings can have much higher specific surface areas, which can be as high as 3500 $m^2/m^3$ or even higher. In the process according to the invention, when the gaseous feed stream is contacted with the cooled body at a pressure below the triple point pressure of $CO_2$, preferably at a pressure in the range of from 1 to 2 bara, the $CO_2$ in the gaseous feed stream is sublimated and deposited on the surface of the cold body as solid $CO_2$. Reference herein to sublimation is to the phase transition of a gas to a solid or of a solid to a gas, without the existence of a liquid phase. It should be noted that pure $CO_2$ has a sublimation temperature of approximately −78° C. at atmospheric pressure, when diluted the sublimation temperature decreases. Typically, a flue gas containing 20 vol % $CO_2$ will have a sublimation temperature of approximately −93° C. at atmospheric pressure.

It is possible to deposit the $CO_2$ as a liquid by contacting the gaseous feed stream with the cooled body at a pressure above the triple point pressure of $CO_2$ of 5.2 bara. Preferably, however, the gaseous feed stream is contacted with the cooled body at a pressure in the range of from 1 to 5 bara, more preferably in the range of from 1 to 2 bara, as the removal of solid $CO_2$ during the regeneration stage is less complicated due to the absence of capillary forces.

The solid $CO_2$ is subsequently removed from the surface and fluid $CO_2$ effluent is obtained by exposing the surface to a temperature above the sublimation temperature of $CO_2$.

Preferably, the porous body is in the form of a fixed bed. Preferably, the porous body is a monolith, for example a ceramic foam. In an equally preferred embodiment, the porous body is comprised of particles, preferably monolithic particles. Optionally, the particles are sintered to each other. Such porous bodies may provide the high specific surface areas, which are beneficial for the heat exchange and the available area for $CO_2$ deposition. Advantages of using monoliths include a lower pressure drop and less axial dispersion of the mass front and in particular the heat front through the porous body.

The process allows for the continuous separation of $CO_2$ from the gaseous feed stream. Using the cold body in the form of dynamically operated fixed beds, the porous body is used as an intermediate energy repository. Accordingly, the process may be operated in a continuous way by providing three porous bodies in the form of three fixed beds. The beds are passed/through a cycle of steps a), b) and c) simultaneously. The fixed beds are operated out of phase, i.e. at any one time one bed is operating step a) (cooling), one bed is operating step b) ($CO_2$ capture) and one bed is operating step c) ($CO_2$ removal). When the bed that is operating step b) is full, it is switched to step c) and the other beds are switched accordingly.

The fixed bed may be any type of fixed bed. The fixed bed may be in the form of a separate entity, a plurality of fixed beds operated in series or parallel, or may be formed by a part, zone or section of a larger fixed bed arrangement.

The porous body may be cooled in step a) by passing a cold fluid stream having a temperature below the sublimation temperature of $CO_2$ into and through the porous body. Preferably, the cold fluid stream is a cold gaseous stream. The cold fluid may for instance be the $CO_2$-depleted effluent obtained from the porous body in step b). This effluent was cooled during the passage through the porous body. Optionally, the $CO_2$-depleted effluent is cooled prior to use in cooling the porous body in step a). Preferably, the $CO_2$-depleted effluent is cooled to a temperature below the sublimation temperature of $CO_2$. Alternatively, the cold fluid is a fluid having a condensation or sublimation temperature below the sublimation temperature of $CO_2$. Preferred examples of such fluids are $N_2$, $H_2$, He, Ne, Ar, Kr, $CH_4$ or a mixture comprising one or more thereof. The choice of the cold fluid may for instance be influenced by the availability of such a fluid. Liquid nitrogen can be obtained easily in bulk quantities. Cold $CH_4$ may be abundantly available at for instance a LNG re-gasification site, typically in the form of liquid natural gas (LNG). Therefore, LNG may also be used as cold fluid. Also, the cost of the cold fluid may be of influence. Therefore, the cold fluid is preferably nitrogen or the $CO_2$-depleted effluent obtained from the porous body in step b).

It will be appreciated that the cold fluid must be provided in sufficient quantities to be able to cool the porous body. Furthermore, the temperature of the cold fluid must be below the sublimation temperature of $CO_2$. However, it is possible to cool the porous body in stages using less cold fluids to pre-cool the fixed bed followed by a cooling step with a fluid that has a temperature below the sublimation temperature of $CO_2$. In order to sufficiently cool the porous body, the cold fluid may preferably have a temperature in the range of from −200 to −100° C., more preferably of from −200 to −125° C., even more preferably of from −200 to −145° C.

When a fixed bed is used, solid $CO_2$ is deposited in the fixed bed during step b) of the process according to the invention. It should however be noted that this does not lead to a significantly increased pressure drop or even clogging of the fixed bed. This is due to the limited amount of energy, also referred to as cold duty, that is stored at any location throughout the fixed bed. For $CO_2$ sublimation with an initial temperature of −150° C., the maximum $CO_2$ mass deposition is below 50 kg per cubic meter of porous body, depending on the volumetric heat capacity of the solid material. Assuming that the porous body comprising solid $CO_2$ has a density of about 1000-1500 $kg/m^3$, depending on the porosity of the deposited $CO_2$ layer, this corresponds to 3-5 vol %. Such volume can easily be stored in a structured or unstructured packing, which can easily have porosities exceeding 20 vol % or more than 30 vol %. Thus, problems with plugging or unacceptable pressure drop increase during the capture cycle can be intrinsically circumvented. This is one of the major advantages of the process according to the invention.

The solid $CO_2$ deposited in the porous body is removed in step c) of the process by passing a warm fluid $CO_2$ stream having a temperature above the sublimation temperature of $CO_2$ into and through the fixed bed comprising solid $CO_2$. Preferably, the warm fluid stream is a warm gaseous $CO_2$ stream. Advantageously, the warm fluid $CO_2$ stream contains a high concentration of $CO_2$, such as in the range of from 50 to substantially 100 vol % of $CO_2$, more preferably 90 to substantially 100 vol % of $CO_2$, even more preferably 99 to substantially 100 vol % of $CO_2$. The warm fluid $CO_2$ stream could for instance be provided by recycling at least part of the fluid $CO_2$ obtained in step c), i.e. the fluid $CO_2$ effluent, back to the porous body. The advantage of using a warm fluid having such a high $CO_2$ concentration is that the effluent of step c) can be used in for instance $CO_2$ mineral sequestration or enhanced oil recovery processes without further purification. The warm fluid may have any temperature at which $CO_2$ sublimates or melts. It will be appreciated that when during step c) the pressure in the fixed bed is above the triple point pressure of $CO_2$, i.e. approximately 5.2 bara, the deposited $CO_2$ may melt. It will be appreciated that liquid $CO_2$ can only exist at certain temperatures above the $CO_2$ triple point. Preferably, the warm fluid has a temperature in the range of from −70 to 50° C., preferably of from −70 to −20° C.

The process according to the present invention can be used to remove $CO_2$ from any gaseous feed stream comprising $CO_2$ and one or more other gaseous compounds. Preferably, the gaseous feed stream comprises at least 3 vol % $CO_2$, preferably in the range of from 5 to 75 vol % of $CO_2$, more preferably 10 to 35 vol % of $CO_2$. In order to maximise the effectiveness of the $CO_2$ separation by sublimation, it is preferred that the one or more other gaseous compounds have a condensation or sublimation temperature below the temperature of the cold porous body. Suitable examples of other gaseous compounds include $N_2$, $O_2$, $H_2$, $CH_4$. Small amounts of hydrocarbon compounds having a condensation or sublimation temperature above the temperature of the cold surface-comprising body or for instance compounds such as $NO_x$, $H_2S$ or $SO_2$ also having a condensation or sublimation temperature above the temperature of the cold surface-comprising body may be tolerated.

Suitable feed streams include for instance flue gas from fossil and biomass-based energy conversion processes. Also suitable are gaseous feed streams comprising mixtures of $CO_2$ with $H_2$ and/or CO. Such streams may for instance be obtained as the effluent of a water-gas-shift reaction zone wherein CO present in synthesis gas (a mixture of predominantly $H_2$ and CO) is converted with water to $CO_2$ and $H_2$.

Flue gas or the effluent of a water-gas-shift reaction zone may typically contain water or steam.

If such fluid feed streams are processed it may be beneficial to first dehydrate the gaseous feed stream, preferably such that in the range of from 80 wt % to substantially 100%, based on the total water or steam present, is removed. More preferably 90 to 99.9 wt %, even more preferably 95 to 99 wt % of the steam is removed. However, it is not necessary to pre-treat the gaseous feed to remove water. In case water is present in the gaseous feed stream to the process according to the invention it is possible to remove, i.e. separate from the gaseous feed stream, the water, together with the $CO_2$, in the process according to the invention. The process according to the present invention therefore provides the advantage that less water, or even no water, needs to be removed from the gaseous feed stream prior to being processed in the process according to the invention. A subsequent separation of water and $CO_2$ may take place to remove the water from the obtained fluid $CO_2$ effluent. However, when using the process according to the invention for capturing the $CO_2$, an advantageous separation between $CO_2$ and water occurs inside the porous body. This separation is based on the difference between the sublimation temperature of $CO_2$ and the condensation, and freezing, temperature of the water. As will be explained in more detail in the examples the water will deposit in another area, typically closer to where the gaseous feed entered the cold porous body, than the $CO_2$. As a result, water and $CO_2$ may be recovered separately from the porous body. Moreover, by creating an initial temperature profile inside the porous body in step a) the separation of $CO_2$ and water inside the porous body/fixed bed may be even further enhanced. Such a temperature profile may for instance involve cooling a first part of the porous body to a temperature below the condensation temperature of water, but above the sublimation temperature of $CO_2$. The second part of the porous body may then be cooled to a temperature below the sublimation temperature of $CO_2$. When the porous body comprising the solid $CO_2$ and the liquid/solid water is contacted with the warm fluid $CO_2$ stream $CO_2$ is recovered prior to the water, due to its low sublimation temperature. Advantageously, the porous body comprising the solid $CO_2$ and the liquid/solid water is contacted with a fluid $CO_2$ stream having a temperature above the sublimation temperature of the solid $CO_2$, but low enough to allow the water to remain solid, preferably having a temperature in the range of from −75 to −1° C., more preferably of from −70 to −10° C. Subsequently, the liquid/solid water may be removed by fluid stream having a temperature sufficiently high to melt and/or evaporate or sublime (i.e. solid to vapour) the liquid/solid water, preferably having a temperature in the range of from 0 to 500° C. Suitable fluids for recovering the water include gaseous streams comprising such as $CO_2$, $N_2$, $H_2$, He, Ne, Ar, Kr, $CH_4$, or air. Preferably, nitrogen is used as the mixture of nitrogen and water can be safely disposed into the atmosphere or if desired can be easily separated. Nitrogen is particularly preferred if nitrogen is also used to cool the porous body in step a). The nitrogen used in step a) can then be used to recover the water from the porous body and the porous body is ready to be cooled in a subsequent step a). Another suitable gas for recovering the water is cleaned flue gas, e.g. the $CO_2$ depleted effluent obtained in step b), as this effluent is readily available. The feed stream from which $CO_2$ is to be separated may have any temperature above the sublimation temperature of $CO_2$ when brought into contact with the cold body. When using the embodiment of the process according to the invention wherein a porous body is used for capturing the $CO_2$, the gaseous feed stream preferably has a temperature in the range of from ambient to 500° C., more preferably of from 100 to 500° C., even more preferably of from 200 to 350° C., when contacting the porous body. The high temperature of the feed may be used to cause the solid $CO_2$ deposition to move in the direction of the gaseous feed stream inside the porous body. Additionally, the porous body is heated in preparation of the solid $CO_2$ removal. This will be further discussed in more detail herein below.

The sublimated $CO_2$ may be recovered as a gas or a liquid. If the pressure in step (c) is raised to above the triple point pressure of $CO_2$, i.e. approximately 5.2 bara, the $CO_2$ melts and can be retrieved as a liquid. The advantage of $CO_2$ recovery as a liquid is a significant cost-reduction in pressurizing gaseous $CO_2$ to a pressure that is required for further processing of the $CO_2$. Preferably, the pressure in step (c) is in the range of from 5.2 to 50.0 bara, more preferably 5.2 to 10 bara, in order to obtain liquid $CO_2$.

The porous body may be prepared from any material able to store a finite amount of cold. Preferably, such a body is made of a material having a high volumetric heat capacity to maximize the amount of energy (cold) that can be stored. Especially preferably are materials that have a volumetric heat capacity of at least $1*10^6$ $J/m^3K$, more preferably a volumetric heat capacity in the range of from $1*10^6$ to $5*10^6$ $J/m^3K$. Advantageously, the material is of relatively low cost and abundantly available. Examples of suitable materials include aluminium, alumina and cordierite.

To optimize the heat transfer and solid $CO_2$ deposition it is preferred that the porous body has a high specific surface area. Preferably, the body has a specific surface area of at least 1000 m$^2$/m$^3$, preferably in the range of from 1000 to 100000 m$^2$/m$^3$, more preferably, 2000 to 50000 m$^2$/m$^3$.

The cold body, may have any temperature below the sublimation temperature of $CO_2$. In order to efficiently provide enough energy for sublimating the $CO_2$, it is preferred that the cold body has a temperature in the range of from −200 to −100° C., preferably in the range of from −175 to −125° C., more preferably −155 to −145° C.

A suitable apparatus for the separation of $CO_2$ from a gaseous feed stream, comprises a vessel comprising a fixed bed of a solid packing, which vessel further comprises:
- a first inlet for fluids arranged to receive fluids having a temperature below the sublimation temperature of $CO_2$;
- a second inlet for fluids arranged to receive fluids having a temperature above the sublimation temperature of $CO_2$;
- a first outlet for fluids arranged to transfer fluids having a temperature below the sublimation temperature of $CO_2$; and
- a second outlet for fluids arranged to transfer fluids having a temperature above the sublimation temperature of $CO_2$;

Preferably, cylindrical stainless steel vessels with cryogenic insulation material are used to hold the fixed bed. It will be appreciated that the vessels must be designed such that they can withstand operating temperatures in the range of −150° C. to 300° C. This may for instance require the use of specific welding techniques and limits the choice in construction materials.

The inlet and outlet for fluid arranged to receive or transfer fluids having a temperature below the sublimation temperature of $CO_2$ should be able to withstand temperatures in the range of from −150° C. to ambient whereas the inlet and outlet for fluids arranged to receive or transfer fluids having a temperature above the sublimation temperature of $CO_2$ should withstand temperatures in the range of from −80 to 300° C. Preferably the inlets and outlets are insulated to prevent energy losses. Optionally, the first and second inlet are the same inlet. Equally, the first and second outlet may be the same outlet. However, this does require that the inlet can withstand temperatures in the range of from −150 to 300° C.

Preferably, the apparatus according to the invention comprises three vessels as defined hereinabove arranged to pass through a cycle of step a), b) and c) of the process according to the invention, simultaneously and out of phase in each vessel. Alternatively, the vessel comprises three fixed beds each operated, simultaneously but out of phase, according to step a), b) and c) of the process according to the invention. It will be appreciated that the three fixed beds may also be three parts, sections or zones of a larger fixed bed arrangement inside the vessel.

The process and apparatus according to the invention are of particular use when integrated with the regasification unit at a liquid natural gas (LNG) terminal. The cold produced during regasification can be advantageously used in step (a) of the process according to the invention, either in the form of cold gaseous $CH_4$ or any other suitable cold medium produced on-site, for instance by heat exchange. The process and apparatus of the present invention are of especial use when combined with the regasification unit at a LNG terminal and with a hydrogen manufacturing unit (HMU), whereby the hydrogen is produced from $CH_4$ and the $CO_2$ in the flue gas of the HMU is separated using the process and apparatus according to the present invention.

The obtained fluid $CO_2$ can suitably be used in further processes. For instance the $CO_2$ can be sequestrated by mineral carbonation processes. In such processes the $CO_2$ is reacted with an aqueous slurry of magnesium or calcium silicates, e.g. olivine, activated serpentine or steel slag. Alternatively, the $CO_2$ can be stored or used in for instance enhanced oil recovery processes.

Detailed Description of the Drawings

FIG. 1 gives a schematic representation of a process according to the invention using three separate fixed beds. It will be appreciated that the same process could be operated discontinuously using a single fixed bed going through a sequence of steps a) to c).

Three fixed beds 101, 102, and 103 filled with solid packing 111, 112 and 113 are operated in parallel and each of the three beds is subjected to three cycles in sequence, namely a capture cycle (step b) of the process according to the invention), a recovery cycle (step c) of the process according to the invention) and cooling cycle a (step a) of the process according to the invention). Hot flue gas 120 is sent via inlet 122 to fixed bed 101 that was refrigerated in a previous cooling cycle to about −150° C. During the capture cycle, $CO_2$ (and when present water) present in flue gas is deposited onto solid bed material 111, consuming the stored 'cold' in the bed material. $CO_2$-depleted effluent 124 is removed at outlet 126 of fixed bed 101. Temperature fronts will move through the bed during the cycle and a relatively high inlet temperature is used to store energy (heat) at the inlet of the bed, which will be used for the removing of the $CO_2$ in the next recovery cycle. The capture cycle is continued until $CO_2$ starts to break through fixed bed 101 and fixed bed 101 is switched to operate the next recovery cycle.

Simultaneously, in fixed bed 102, which was loaded with solid $CO_2$ in a previous capture cycle, $CO_2$ is removed from solid packing 112 in a recovery cycle. During the recovery cycle, a pure gaseous $CO_2$ stream 130 is introduced in fixed bed 102 via inlet 132 and passed through solid packing 112. Through outlet 134, fluid $CO_2$ 136 is obtained comprising $CO_2$ removed from solid packing 112. Part of fluid $CO_2$ may be recycled via recycle line 137 and compressor 138. The hot temperature zone created at the inlet of fixed bed 102 during the previous capture cycle moves through the bed and makes sure that the sublimated $CO_2$ (along with the condensed and frosted $H_2O$) is removed. Once the $CO_2$ has been removed from solid packing 112, the bed is cooled in a subsequent cooling cycle.

Also simultaneously, in fixed bed 103, from which $CO_2$ was unloaded in a previous recovery cycle, solid packing 113 is cooled in a cooling cycle by passing cold $N_2$ stream 140 via inlet 142 through fixed bed 113. $N_2$ stream 140 is further cooled by recycling part of $N_2$ stream 144 exiting fixed bed 113, via outlet 146, via recycle line 148 and compressor 149. $N_2$ recycle 152 is cooled against refrigerant 154 in separate, conventional, cryogenic heat exchanger 156.

EXAMPLES

The invention is illustrated by the following non-limiting examples.

Figure 2:
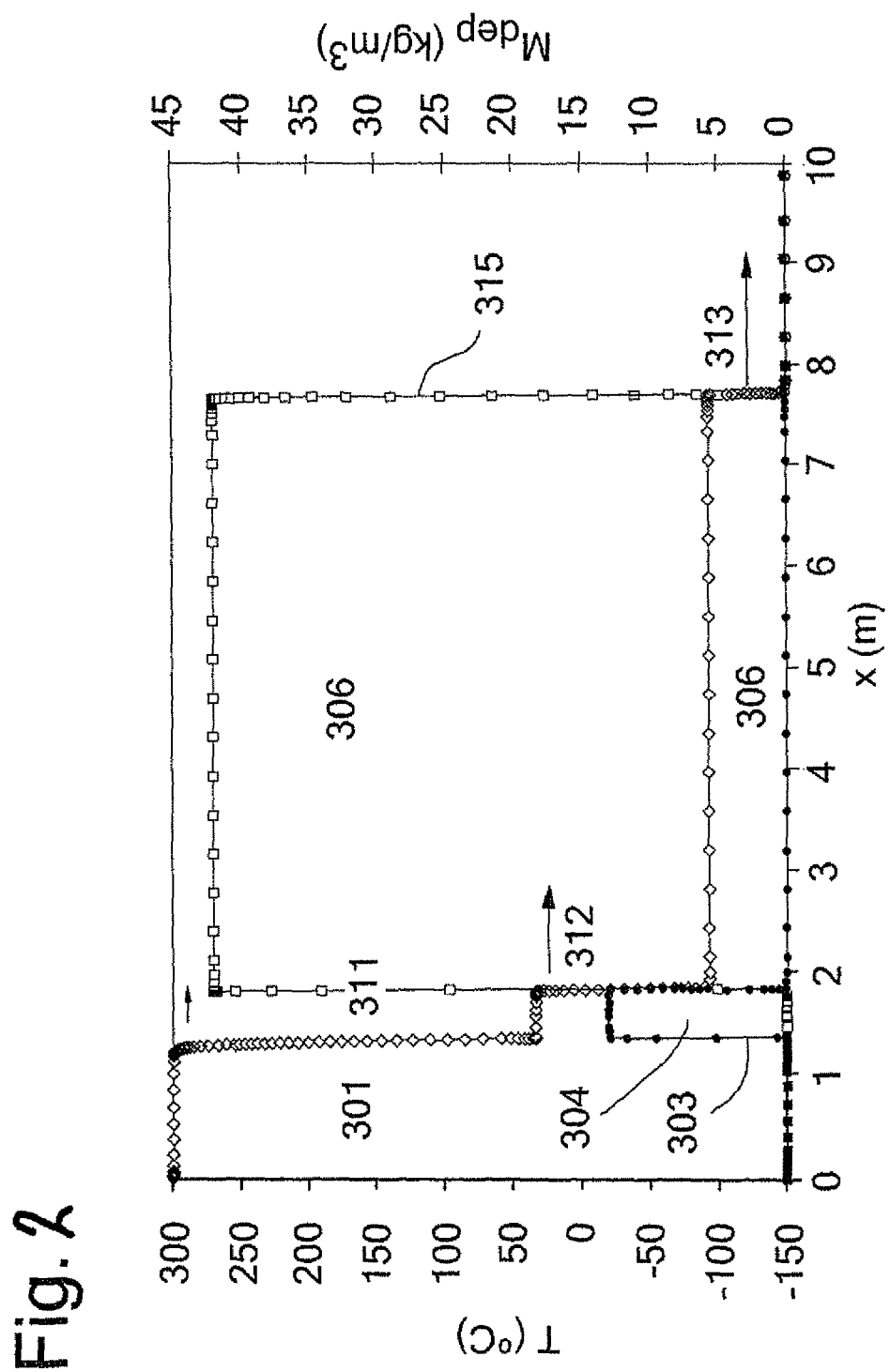
FIG. 2: a schematic representation of a temperature profile and mass deposition profile within a cooled porous body.
Figure 3:
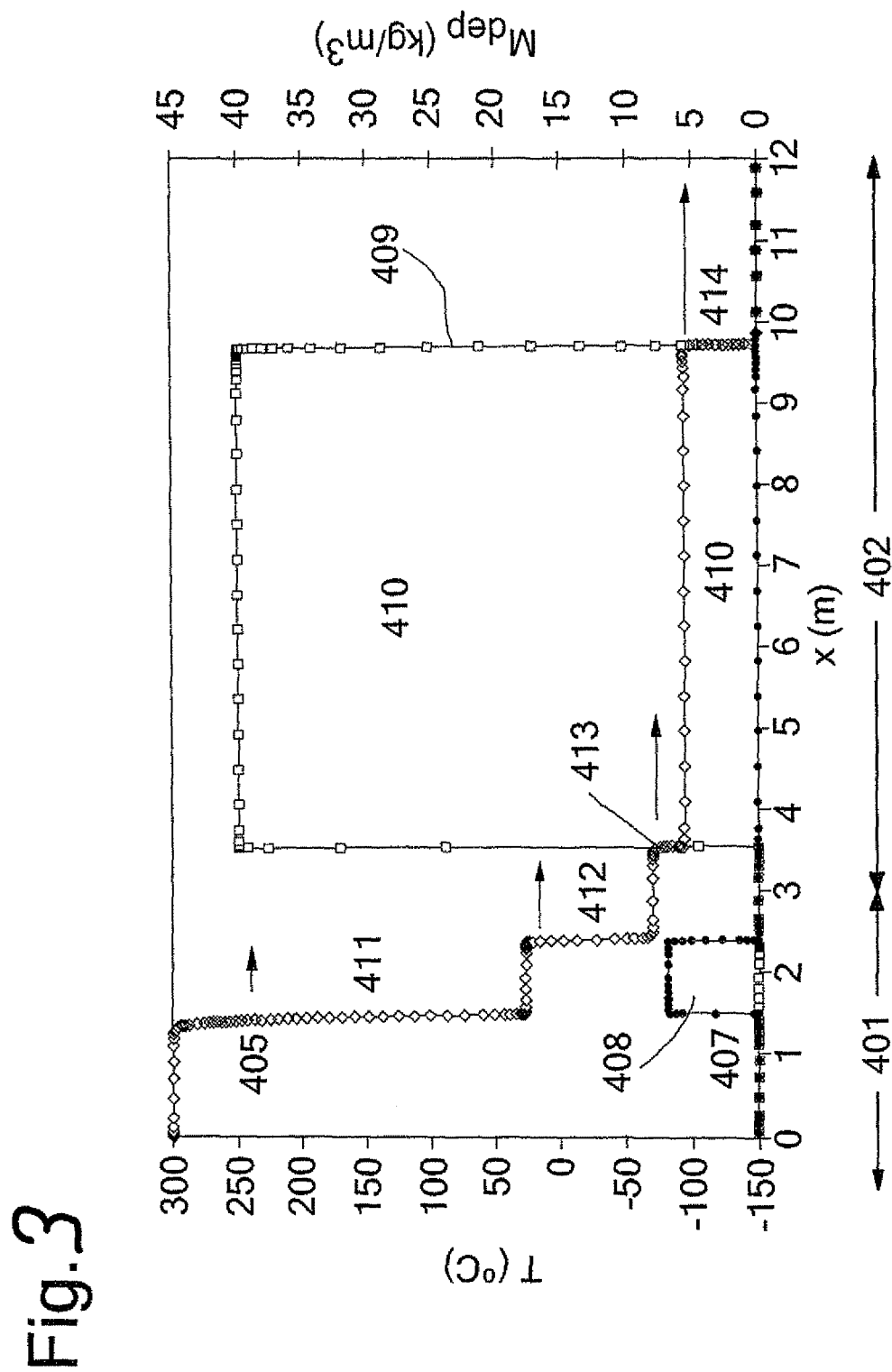
FIG. 3: another schematic representation of a temperature profile and mass deposition profile within a cooled porous body.

The basic principle of the novel process for cryogenic $CO_2$ separation via dynamically operated fixed beds is depicted in FIGS. 2 and 3. The separation process is illustrated using a numerical model, wherein an effective separation between $CO_2$, $H_2O$ and the permanent gases is achieved on the basis of differences in dew and sublimation temperatures. In FIG. 2, the line indicated by reference number 301, gives the temperature (T) of the flue gas scaled on the left y-axis. Lines 303 and 305, show the mass deposition ($M_{dep}$) of $H_2O$ and $CO_2$, respectively, in the packed bed along the longitudinal x-axis. The mass deposition is scaled against the right y-axis. Areas 304 and 306 below lines 303 and 305, respectively, are a measure for the total deposited mass.

A flue gas of 300° C. containing $CO_2$, $H_2O$ and inert gas $N_2$ (20.9, 1.2, 77.9 vol %) is fed to an initially uniformly cooled packed bed of cordierite particles at axial position (x-axis, x) 0 and moves through the bed from left to right (increasing axial position value). The initial temperature of the packed bed was −150° C. In FIG. 2, the temperature profile and mass deposition profile are shown for an arbitrary chosen time during step b) of the porous body embodiment of the process according to the invention. As can be seen from FIG. 3, three temperature fronts 311, 312 and 313 develop, which move through the bed with different front velocities (as indicated by the length of the arrows). The temperature front 311 corresponds to the location where the gas mixture is cooled down to just above its (first) dew point, in this case around 36° C. Actually, at temperature front 311 the solid packing is heated by the flue gas and previously condensed $H_2O$ is evaporated. At temperature front 312 all the $H_2O$ present in the flue gas is condensed (area 304). Due to $H_2O$ evaporation at temperature front 311, the local $H_2O$ partial pressure is higher than the $H_2O$ partial pressure in the inlet flue gas (and depends on the feed temperature and the initial temperature), and hence the dew point of the local gas mixture and the first plateau temperature are slightly higher.

At temperature front 312, all the $H_2O$ is condensed from the flue gas and the dehydrated flue gas is cooled down further to just above its second dew point (about −93° C.), while simultaneously heating up the bed to just above the sublimation point of $CO_2$. Again, at temperature front 312, $CO_2$ that was deposited before, sublimates and is deposited (area 306) onto the solid packing again at temperature front 313. At temperature front 313, the flue gas is cooled down to the initial temperature of the bed, i.e. −150° C.

The front velocity of temperature front 313 is larger than that of temperature front 312, which is again larger than the front velocity of temperature front 311, corresponding to the growing amount of $H_2O$ condensed and $CO_2$ deposited onto the solid packing in the packed bed during the capture cycle. It is noted that the amount of $H_2O$ condensed and the amount of $CO_2$ sublimated per unit volume solid packing reaches a maximum, which corresponds to the maximum amount of cold stored in the solid packing (i.e. the difference between the dew temperatures and the initial temperature). For $CO_2$ sublimation with an initial temperature of −150° C., the maximum $CO_2$ mass deposition is typically below 50 kg/m3, depending on the volumetric heat capacity of the solid packing. As mentioned herein before, such amounts of solid $CO_2$ can easily be stored in a structured or unstructured packing. Thus, problems with plugging or unacceptable pressure drop increase during the capture cycle can be intrinsically circumvented.

Another important benefit of the porous body/fixed bed embodiment of the process according to the invention is that the outlet gas temperature is at the very minimum temperature of the refrigerant during almost the entire capture cycle, so that during almost the entire cycle the maximum possible $CO_2$ capture is actually achieved.

In FIG. 3, an embodiment is illustrated wherein during step a) of the porous body embodiment of the process according to the invention, an initial temperature profile is introduced in the fixed bed. By creating such an initial temperature profile inside the porous body in step a) the separation of $CO_2$ and water inside the porous body/fixed bed may be even further enhanced. Such a temperature profile may for instance involve cooling a first part of the porous body to a temperature below the condensation temperature of water, but above the sublimation temperature of $CO_2$. The second part of the porous body may then be cooled to a temperature below the sublimation temperature of $CO_2$. In FIG. 3 it is illustrated that the separation between $CO_2$ and $H_2O$ is enhanced by making effective use of an initial temperature profile. In FIG. 3, the line indicated by reference number 405, gives the temperature (T) of the flue gas scaled on the left y-axis. Lines 407 and 409 show the mass deposition ($M_{dep}$) of $H_2O$ and $CO_2$ respectively, in the packed bed along the longitudinal x-axis. The mass deposition ($M_{dep}$) is scaled against the right y-axis. Areas 408 and 410 below lines 407 and 409, respectively, are a measure for the total deposited mass.

A flue gas of 300° C. containing $CO_2$, $H_2O$ and inert gas $N_2$ (20.9, 1.2, 77.9 vol %) is fed to an initially uniformly cooled packed bed of cordierite particles at axial position (x-axis, x) 0 and moves through the bed from left to right (increasing axial position value). The initial temperature of the packed bed was −150° C. The packed bed is split into two zones, i.e. axial position 0 to 3 m (zone 401) and axial position 3 to 10 m (zone 402). Zone 401 is cooled down to −70° C., i.e. above the $CO_2$ sublimation point, but below the $H_2O$ condensation point. Zone 402 is cooled to −150° C., i.e. below the $CO_2$ sublimation point. In FIG. 3, the temperature profile and mass deposition profile are shown for an arbitrary chosen time during step b) of the porous body embodiment of the process according to the invention. As can be seen from FIG. 3, four temperature fronts 411, 412, 413 and 414 develop, which move through the bed with different front velocities (as indicated by the length of the arrows). As can be seen from FIG. 3, a distinct separation between $H_2O$ and $CO_2$ is obtained. Effectively, the location where condensed $H_2O$ is found (area 408) is separated from the area where $CO_2$ is deposited (area 410). It will be appreciated that in practice the length of initial temperature zones 401 and 402 should be tuned with the flue gas feed composition, flue gas throughput and the cycle time. With an initial temperature profile a virtually perfect separation is possible, however, at the expense of a slightly larger bed volume.

What is claimed is:

1. A process for the separation of $CO_2$ from a gaseous feed stream, comprising the steps of:
   a) cooling a porous body in the form of a fixed bed to a temperature in the range of from −200° C. to −100° C. to obtain a cold body, said cold body having a surface with a specific surface area of from 1000 to 100000 $m^2/m^3$;
   b) contacting a gaseous feed stream comprising $CO_2$ and one or more other gaseous compounds with the surface of the cold body to obtain a porous body comprising solid $CO_2$ and a $CO_2$-depleted effluent gas; and
   c) removing the solid $CO_2$ by exposing the porous body comprising solid $CO_2$ to a fluid $CO_2$ stream having a temperature above the sublimation temperature of $CO_2$ whereby fluid $CO_2$ and a warm porous body are obtained.

2. A process according to claim 1, wherein the fluid $CO_2$ stream comprises fluid $CO_2$ obtained in step c).

3. A process according to claim 1, wherein the gaseous feed stream comprises water and the water is removed from the gaseous feed stream together with the $CO_2$.

4. A process according to claim 3, wherein the $CO_2$ and water are recovered separately from the porous body.

5. A process according to claim 1, wherein the porous body is a monolith or is comprised of monolithic particles.

6. A process according to claim 1, wherein in step (a) the porous body is cooled by passing a cold fluid stream having a temperature in the range of from −100° C. to −200° C., into and through the porous body.

7. A process according to claim 1, wherein the $CO_2$-depleted effluent stream obtained in step (b), or a fluid having a condensation or sublimation temperature below the sublimation temperature of $CO_2$ is utilized for cooling the porous body.

8. A process according to claim 1, wherein in step b) the gaseous feed stream is contacted with the surface of the cold body at a pressure in the range of from 1 to 2 bara.

9. A process according to claim 1, comprising providing three porous bodies in the form of three fixed beds and passing the beds through a cycle of steps (a), (b) and (c) simultaneously and out of phase.

10. A process according to 1, wherein the porous body has a porosity exceeding 20 vol %.

11. A process according to claim 1, wherein the gaseous feed stream is a flue gas stream or a stream comprising a mixture of one or more of the following: $CO_2$, $H_2$ and CO.

12. A process according to claim 1, wherein the porous body has a porosity exceeding 30 vol %.

13. A process according to claim 1, wherein the cold body having a surface comprises a ceramic or metal.

14. A process according to claim 7, wherein the fluid having a condensation or sublimation temperature below the sublimation temperature of $CO_2$ is selected from $N_2$, $H_2$, He, Ne, Ar, Kr, $CH_4$, LNG or a mixture of one or more thereof.

15. A process according to claim 1, wherein the temperature of the cold body having a surface is in the range of from −175 to −125 degrees C.

16. A process according to claim 1, wherein the temperature of the cold body having a surface is in the range of from −155 to −145 degrees C.

17. A process according to claim 16, wherein the porous body is a monolith or is comprised of monolithic particles.

18. A process according to claim 1, wherein the cold body having a surface has a specific surface area from 2000 to 50,000 $m^2/m^3$.

19. A process according to claim 1, wherein the cold body having a surface comprises alumina or cordierite.

20. A process according to claim 6, wherein the cold fluid stream is a cold gaseous stream.

21. A process according to claim 1, wherein the maximum amount of $CO_2$ deposited on the porous body is below 50 kg per cubic meter of porous body.

22. A process according to claim 1, wherein the gaseous feed stream comprises from 5 to 75 vol % $CO_2$.

23. A process according to claim 22, wherein the fluid $CO_2$ stream in step c) contains a high concentration of $CO_2$ in the range of from 90 to substantially 100 vol %.

24. A process according to claim 23, wherein the maximum $CO_2$ mass deposition of the porous body is below 50 kg per cubic meter of porous body.

* * * * *